(12) United States Patent
Jump et al.

(10) Patent No.: US 11,783,361 B1
(45) Date of Patent: Oct. 10, 2023

(54) SYSTEM FOR GENERATING A LOYALTY ACCOUNT BASED UPON PAYMENT CARD TRANSACTION TOKEN AND RELATED METHODS

(71) Applicant: Inmar Clearing, Inc., Winston-Salem, NC (US)

(72) Inventors: Andrew B. Jump, Lewisville, NC (US); Alise Raak, Winston-Salem, NC (US); Sylvain Mansier, Weston, MA (US); Pia Ostos, Newton, MA (US)

(73) Assignee: INMAR CLEARING, INC., Winston-Salem, NC (US)

(*) Notice: Subject to any disclaimer, the term of this patent is extended or adjusted under 35 U.S.C. 154(b) by 0 days.

(21) Appl. No.: 17/506,132

(22) Filed: Oct. 20, 2021

(51) Int. Cl.
| | | |
|---|---|---|
| *G06Q 30/00* | (2023.01) | |
| *G06Q 30/0226* | (2023.01) | |
| *G06Q 20/20* | (2012.01) | |
| *G06Q 30/0238* | (2023.01) | |
| *G06Q 30/0207* | (2023.01) | |
| *G06K 1/12* | (2006.01) | |
| *G06Q 20/02* | (2012.01) | |

(52) U.S. Cl.
CPC ......... *G06Q 30/0226* (2013.01); *G06K 1/121* (2013.01); *G06Q 20/02* (2013.01); *G06Q 20/202* (2013.01); *G06Q 20/209* (2013.01); *G06Q 30/0224* (2013.01); *G06Q 30/0236* (2013.01); *G06Q 30/0238* (2013.01)

(58) Field of Classification Search
CPC ........... G06Q 30/0226; G06Q 30/0224; G06Q 30/0236; G06Q 30/0238; G06Q 20/02; G06Q 20/202; G06Q 20/209; G06K 1/121

See application file for complete search history.

(56) References Cited

U.S. PATENT DOCUMENTS

| | | | |
|---|---|---|---|
| 2012/0271770 A1* | 10/2012 | Harris | G06Q 20/00 |
| | | | 705/65 |
| 2014/0310080 A1 | 10/2014 | Salmon et al. | |
| 2016/0232556 A1 | 8/2016 | Postrel | |
| 2017/0249667 A1* | 8/2017 | Castrechini | G06Q 30/0238 |
| 2019/0026756 A1 | 1/2019 | Fordyce, III | |
| 2020/0027113 A1* | 1/2020 | Robeen | G06Q 20/355 |
| 2020/0273058 A1* | 8/2020 | Mori | G06Q 30/0226 |
| 2021/0224808 A1* | 7/2021 | Al-Ansari | G06Q 20/387 |

* cited by examiner

*Primary Examiner* — Meredith A Long
(74) *Attorney, Agent, or Firm* — ALLEN, DYER, DOPPELT, + GILCHRIST, P.A.

(57) ABSTRACT

A system may include a point-of-sale (POS) terminal, and a server configured to obtain, from the POS terminal, a purchase transaction identifier and a purchase amount associated with a purchase transaction of a given user. The server may also be configured to obtain, from a payment card processing server, a payment card transaction token associated with the purchase transaction, and match the payment card transaction token to the purchase transaction identifier, and based thereon, generate a loyalty account associated with the given user based upon the payment card transaction token. The server may also be configured to credit the loyalty account associated with the given user based upon the purchase amount, and generate and communicate a notification to the given user of the loyalty account and the associated credit.

19 Claims, 10 Drawing Sheets

SYSTEM FOR GENERATING A LOYALTY ACCOUNT BASED UPON PAYMENT CARD TRANSACTION TOKEN AND RELATED METHODS

TECHNICAL FIELD

The present invention relates to the field of payments, and, more particularly, to payment card transaction tokens and related methods.

BACKGROUND

A payment token is a non-sensitive data element that is substituted for sensitive payment data. Standing alone, a payment token has no extrinsic or exploitable meaning or value. The payment token may be considered a reference (i.e., identifier) that maps to the sensitive payment data.

A loyalty program is a marketing strategy that encourages shoppers to continue to purchase items or services from one or more retailers, for example. A loyalty program typically involves the retailer or other entity that operates or manages the loyalty program to set up an account for a user. Rewards are added or associated with the loyalty account, for example, based upon purchases made at the retailer.

Sales of a particular product or service may be based upon how well that product or service is marketed to a consumer. One form of marketing is a coupon, typically in paper form, for a discount toward the product or service. Some coupons may be retailer specific, for example, only redeemable for the discount at a particular retailer, while other coupons may be product specific from a manufacturer and redeemable at any retailer.

A coupon, while typically in paper form, may be in digital form and may be referred to as a digital promotion. A digital promotion may be selected or "clipped" via a mobile phone and saved to a digital wallet for redemption at a point-of-sale (POS) terminal, for example. A typical coupon is applicable to a given product and has a redeemable value that may vary based upon, for example, the quantity of a given item, brand of item, size of the product in terms of packaging, and/or the price point of the given item. A typical coupon may also be redeemable only at a given retailer and/or within a threshold time period.

SUMMARY

A system may include a point-of-sale (POS) terminal, and a loyalty processing server configured to obtain, from the POS terminal, a purchase transaction identifier and a purchase amount associated with a purchase transaction of a given user. The loyalty processing server may also be configured to obtain, from a payment card processing server, a payment card transaction token associated with the purchase transaction, and match the payment card transaction token to the purchase transaction identifier, and based thereon, generate a loyalty account associated with the given user based upon the payment card transaction token. The loyalty processing server may also be configured to credit the loyalty account associated with the given user based upon the purchase amount, and generate and communicate a notification to the given user of the loyalty account and the associated credit.

The loyalty processing server may be configured to obtain, from the POS terminal, a further purchase transaction identifier and a further purchase amount associated with a further purchase transaction of the given user, and obtain, from the payment card processing server, the payment card transaction token associated with the further purchase transaction. The loyalty processing server may also be configured to match the payment card transaction token to the further purchase transaction identifier, and credit the loyalty account associated with the given user based upon the further purchase amount based upon the payment card transaction token, for example.

The loyalty processing server may be configured to identify a retailer loyalty account associated with the given user based upon a retailer loyalty account identifier, and transfer a credited amount from the loyalty account based upon the payment card transaction token to the retailer loyalty account based upon the retailer loyalty account identifier, for example. The loyalty processing server may be configured to cooperate to redeem at least a portion of the credited amount toward a retailer purchase transaction at a retailer associated with the retailer loyalty account. The retailer loyalty account identifier may include at least one of an email address and a phone number associated with the given user, for example.

The loyalty processing server may be configured to communicate the notification to the POS terminal for printing on a register receipt. The notification may include a quick-response (QR) code, for example. The POS terminal may be associated with a given retailer, and the system may also include a user device associated with the given user and configured to cooperate with the server to permit the given user to register for a retailer loyalty account based upon the QR code, for example.

The loyalty processing server may be configured to store a product purchase history of the given user based upon the payment card transaction token, generate and communicate a digital promotion to the given user based upon the product purchase history. The system may further include a user device associated with the given user, for example, and the loyalty processing server may be configured to communicate the notification to the user device for display thereat. The payment card transaction token may include a serialized payment card transaction token, for example.

A method aspect is directed to a method of loyalty processing. The method may include using a loyalty processing server to obtain, from a point-of-sale (POS) terminal, a purchase transaction identifier and a purchase amount associated with a purchase transaction of a given user, and obtain, from a payment card processing server, a payment card transaction token associated with the purchase transaction. The method may also include using the loyalty processing server to match the payment card transaction token to the purchase transaction identifier, and based thereon, generate a loyalty account associated with the given user based upon the payment card transaction token, and credit the loyalty account associated with the given user based upon the purchase amount. The method may also include using the loyalty processing server to generate and communicate a notification to the given user of the loyalty account and the associated credit.

A computer readable medium aspect is directed to a non-transitory computer readable medium that includes computer executable instructions that when executed by a processor cause the processor to perform operations. The operations may include obtaining, from a point-of-sale (POS) terminal, a purchase transaction identifier and a purchase amount associated with a purchase transaction of a given user, and obtaining, from a payment card processing server, a payment card transaction token associated with the purchase transaction. The operations may also include matching the payment card transaction token to the purchase transaction identifier, and based thereon, generating a loyalty account associated with the given user based upon the payment card transaction token. The operations may also include crediting the loyalty account associated with the given user based upon the purchase amount, and generating and communicating a notification to the given user of the loyalty account and the associated credit.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments. Prime notation is used to refer to like elements in different embodiments.

Figure 1:
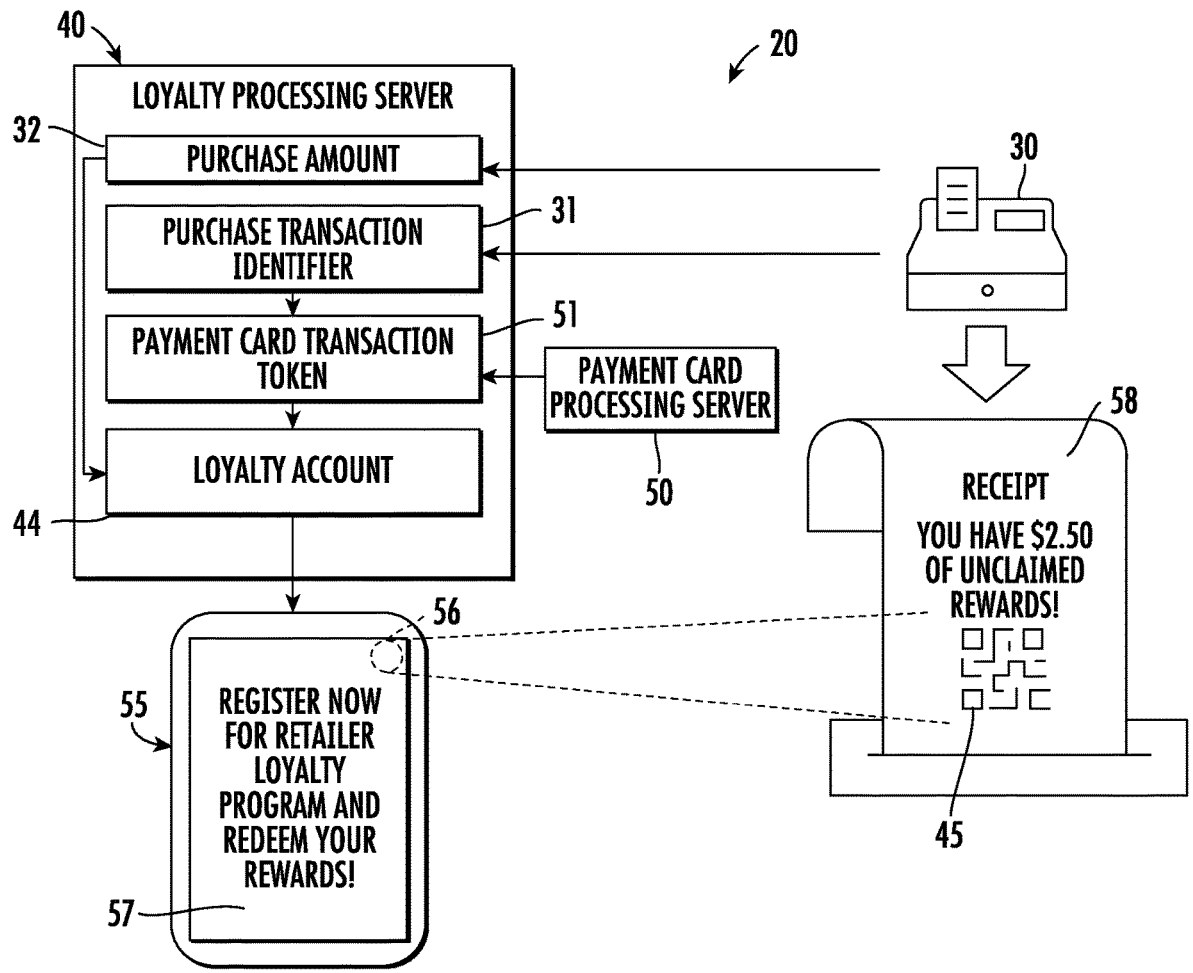
FIG. 1 is a schematic diagram of a loyalty processing system according to an embodiment.
Figure 2:
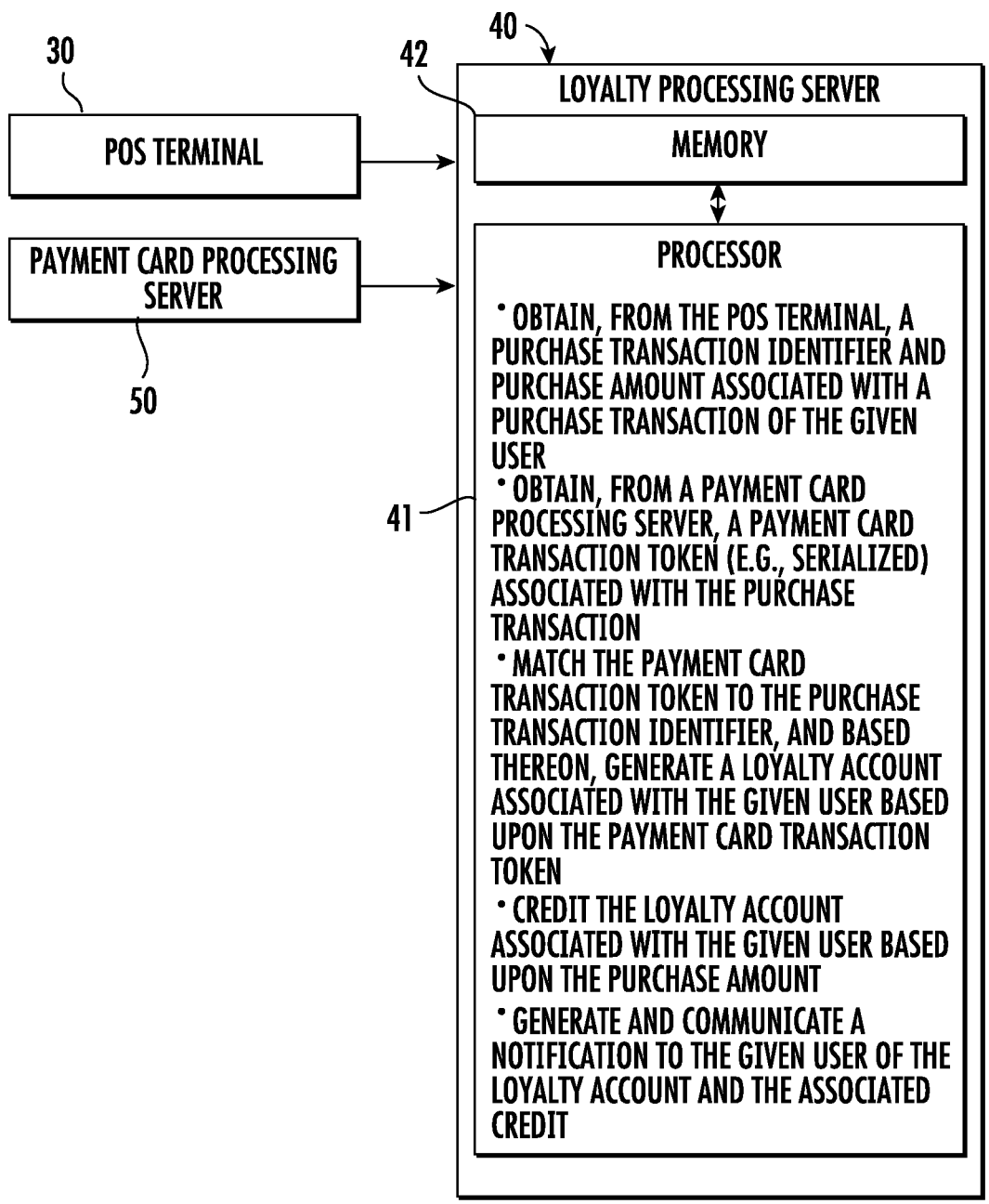
FIG. 2 is a schematic block diagram of the loyalty processing system of FIG. 1.

Referring initially to FIGS. 1 and 2, a loyalty processing system 20 includes a point-of-sale (POS) terminal 30. The POS terminal 30 may be associated with a given retailer, for example, and may be located at a store associated with the given retailer.

The loyalty processing system 20 also includes a loyalty processing server 40. The loyalty processing server 40 includes a processor 41 and an associated memory 42. While operations of the loyalty processing server 40 are described herein, it should be appreciated that the operations of the loyalty processing server are performed by cooperation between the processor 41 and the associated memory 42.

Figure 3:
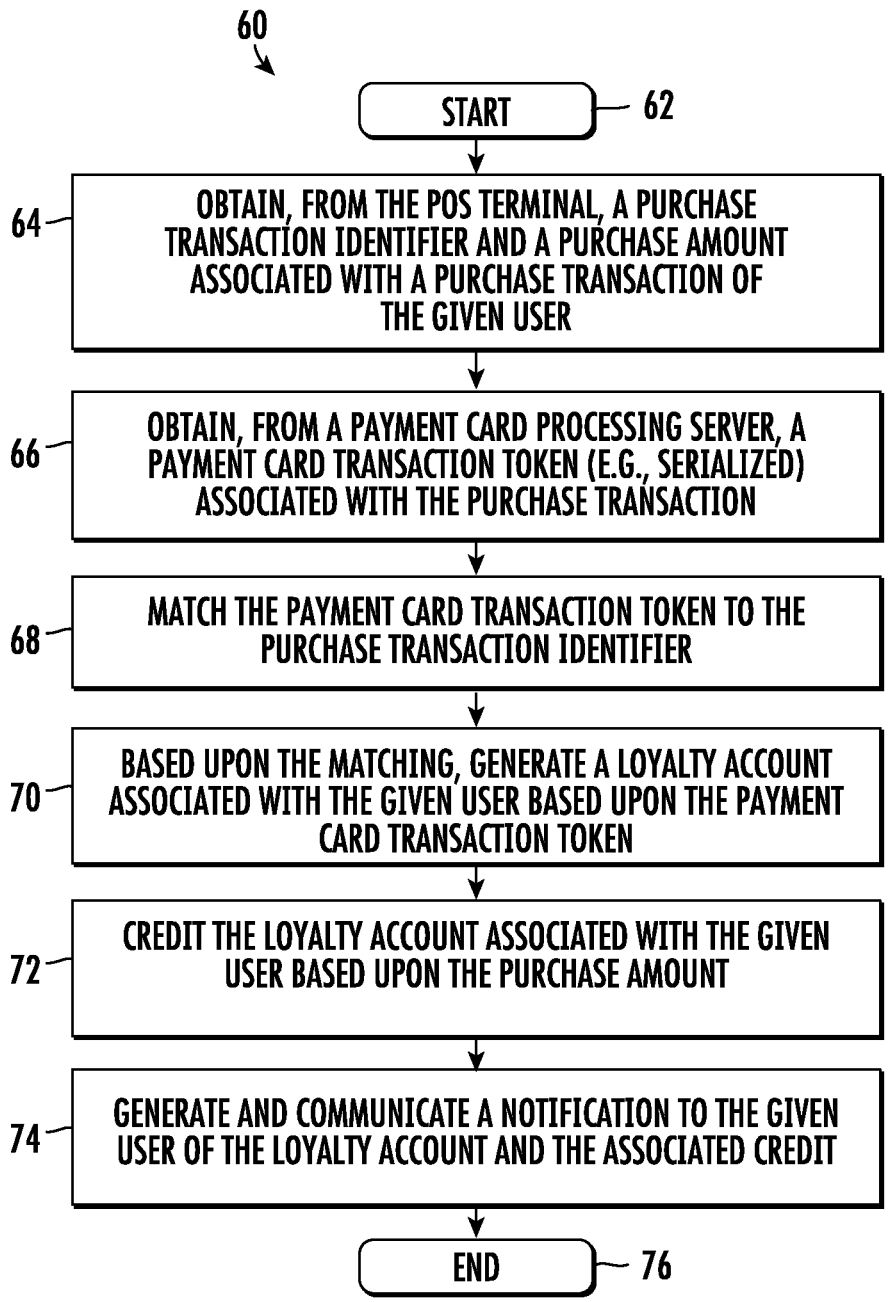
FIG. 3 is a flow diagram illustrating operation of the loyalty processing server of FIG. 1.

Referring now additionally to the flowchart 60 in FIG. 3, beginning at Block 62, operations of the loyalty processing server 40 will now be described. At Block 64, the loyalty processing server 40 obtains, from the POS terminal 30, a purchase transaction identifier 31 and a purchase amount 32 associated with a purchase transaction of a given user.

The purchase amount 32 may include a subtotal or purchase price of products being purchased at the POS terminal 30 during a purchase transaction. The purchase amount 32 may be updated on a per-item basis, for example, as each item being purchased is scanned at the POS terminal 30. More particularly, the POS terminal 30 may communicate the purchase price of each item as it is being purchased.

The loyalty processing server 40 obtains, from a payment card processing server 50, a payment card transaction token 51 associated with the purchase transaction (Block 66). The payment card transaction token 51 may be a serialized payment transaction token, for example. As will be appreciated by those skilled in the art, the payment card transaction token 51 may serve as a unique identifier (UID) and may be considered a substitute for a credit card or other payment card number, for example. Upon completion of a purchase transaction, the given user may present a payment card to complete the purchase transaction at the POS terminal 30. Information associated with the payment card, such as, for example, the payment card number, expiration date, etc. may be communicated to the payment card processing server 50 from the POS terminal 30 along with the purchase amount. Other and/or additional information may be communicated between the POS terminal 30 and the payment card processing server 50. Once the payment has been approved by the payment card processing server 50, the payment card processing server may communicate a status, such as, for example, approved, to the POS terminal 30 along with the payment card transaction token 51, which is also communicated to the loyalty processing server 40.

At Block 68, the loyalty processing server 40 matches the payment card transaction token 51 to the purchase transaction identifier 31. Based upon the matching, the loyalty processing server 40 generates or creates a loyalty account 44 associated with the given user and based upon the payment card transaction token 51 (Block 70). More particularly, the loyalty processing server 40 creates a multi-retailer loyalty account 44 with the payment card transaction token 51 serving as the loyalty account identifier. The given user, from the perspective of the loyalty processing server 40 may be considered anonymous, for example, in that there is no name or other personal identifying information processed at this stage with respect to the given user.

The loyalty processing server 40, at Block 72, credits the loyalty account associated with the given user based upon the purchase amount 32. The amount of the credit to be credited to the loyalty account 44 may be based upon the purchase amount 32, for example. The amount of the credit may also be based upon the quantities, brands, and types of items purchased. Other and/or additional factors may be used as a basis for determining the amount of the credit. For example, the loyalty processing server 40 may increase the credit amount based upon brand loyalty—that is the more of a given brand of products purchased by the given user. In some embodiments, the credit may be based upon a percentage of the total purchase amount 32, for example, 0.1%, which may change, for example, increase, based upon the amount of products purchased increasing and/or the overall purchase amount increasing. As will be appreciated by those skilled in the art, the payment card transaction token 51 may be used as an index to create a multi-retailer user or shopper profile.

The loyalty processing server 40 generates and communicates a notification 45 to the given user of the loyalty account 44 and the associated credit (Block 74). More particularly, the loyalty processing server 40 may communicate the notification 45 to the POS terminal 30 for printing on a register receipt 58. The notification 45 may be in the form of a quick-response (QR) code, for example, printed on the bottom of the register receipt 58 and accompanying text identifying the existence of the loyalty account 44 and the corresponding credit amount. The given user has an associated user device 55, for example, in the form of a mobile wireless communications device (e.g., mobile phone, tablet computer, wearable computer, etc.). The given user may operate the user device 55, and more particularly, the camera 56 of the user device, to capture the QR code 45, which in turn may open an application or web browser on the display 57 to permit the given user to register or claim the loyalty account 44, as will be described in further detail below. Operations end at Block 76.

Figure 4:
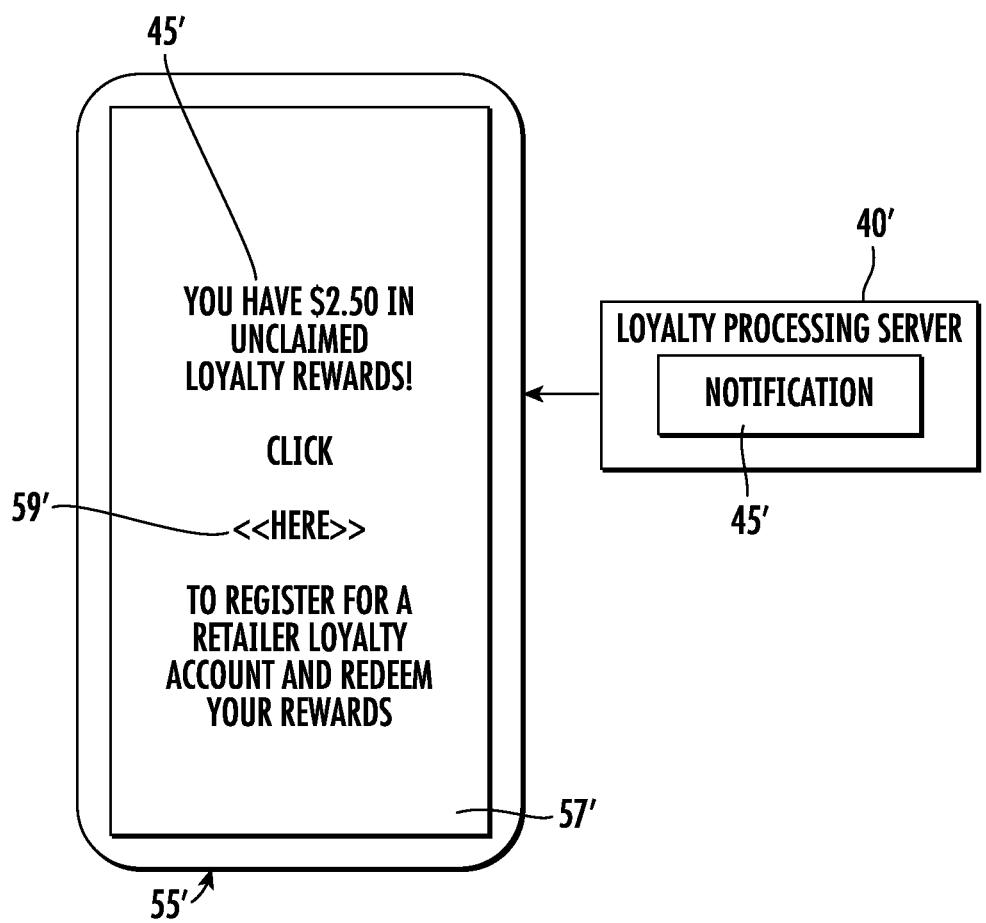
FIG. 4 is a schematic diagram of a portion of a loyalty processing system according to another embodiment.

Referring now briefly to FIG. 4, in another embodiment, the loyalty processing server 40' may communicate the notification 45' to the user device 55' for display on the display 57'. The notification 45' may include a link 59', for example, to an application or a hyperlink to a registration webpage.

Figure 5:
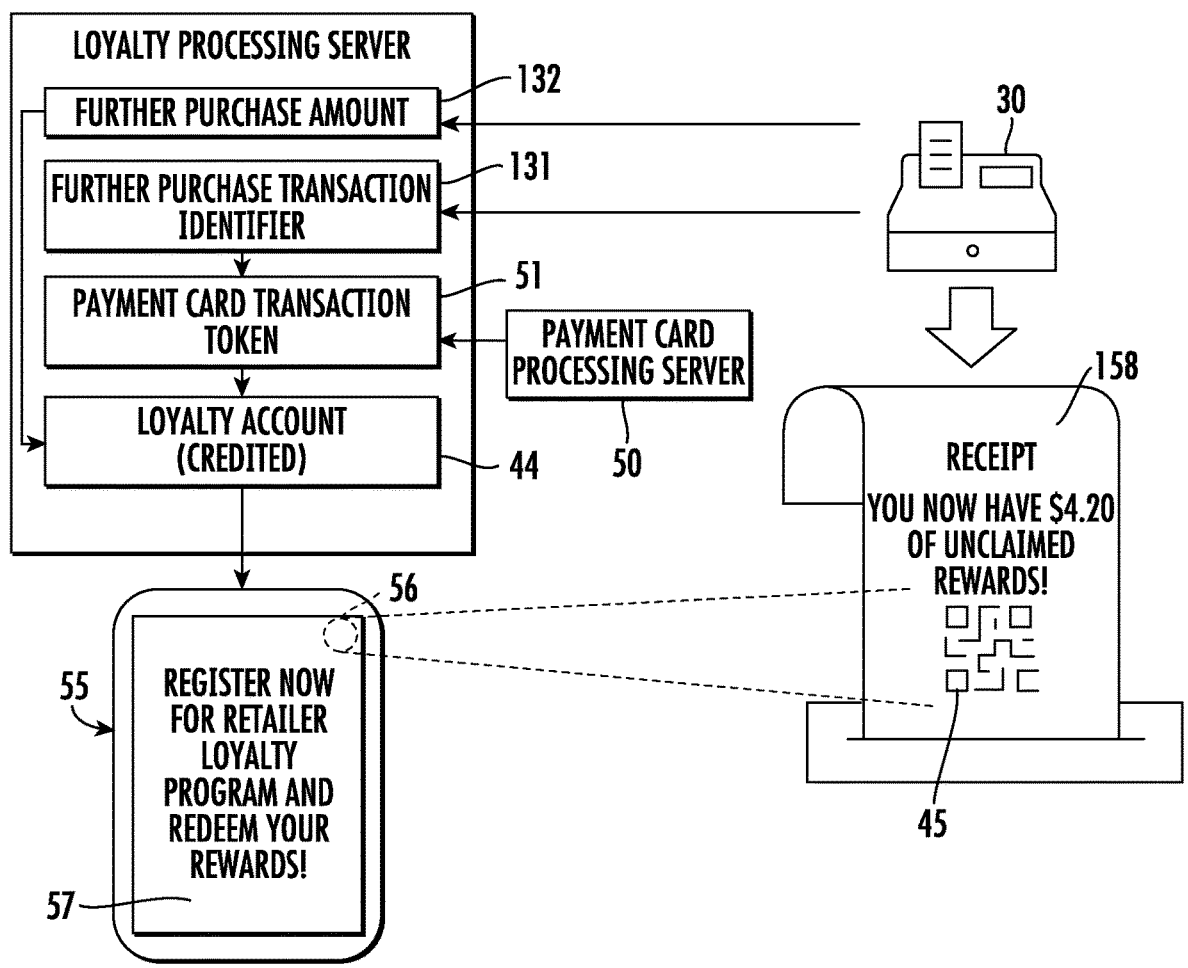
FIG. 5 is another schematic diagram of the loyalty processing system according to an embodiment.
Figure 6:
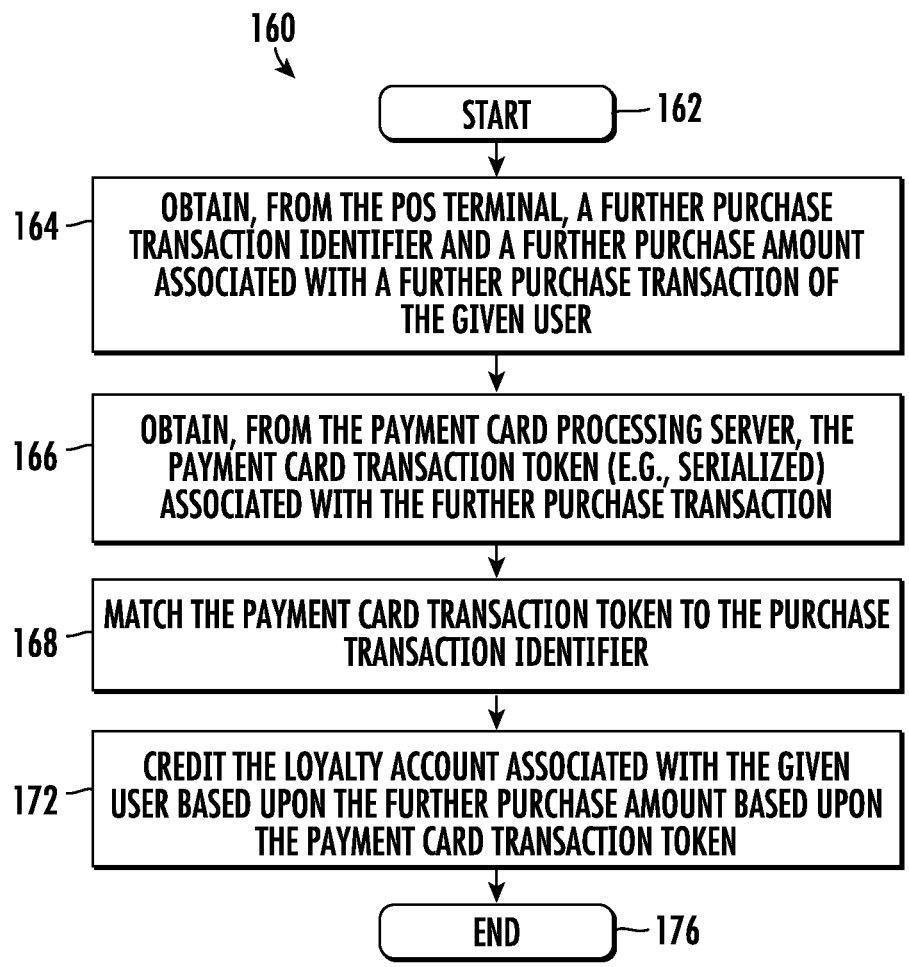
FIG. 6 is a flow diagram illustrating operation of the loyalty processing server of FIG. 5.

Referring now additionally to FIG. 5 and the flowchart 160 in FIG. 6, beginning at Block 162 operations of the loyalty processing server 40 with respect to adding a purchase amount to an already generated loyalty account 44. At Block 164, the loyalty processing server 40 obtains, from the POS terminal 30, a further purchase transaction identifier 131 and a further purchase amount 132 associated with a further purchase transaction of the given user. The loyalty processing server 40 obtains, from the payment card processing server 50, the payment card transaction token 51 associated with the further purchase transaction (Block 166). The payment card transaction token 51 may be the same for a given user and payment card or payment cards processed by the payment card processing server 50, for example.

The loyalty processing server 40 matches the payment card transaction token 51 to the further purchase transaction identifier 131 (Block 168). At Block 172, the loyalty processing server 40 credits the loyalty account 44 associated with the given user based upon the further purchase amount 132 based upon the payment card transaction token 51. As will be appreciated by those skilled in the art, each time the given user makes a purchase, the loyalty account 44, identified by the payment card transaction token 51, is credited. The updated credit amount associated with the loyalty account 44 may be communicated to the given user via a notification 45 as described above, for example, on an updated register receipt 158. Operations end at Block 176.

Figure 7:
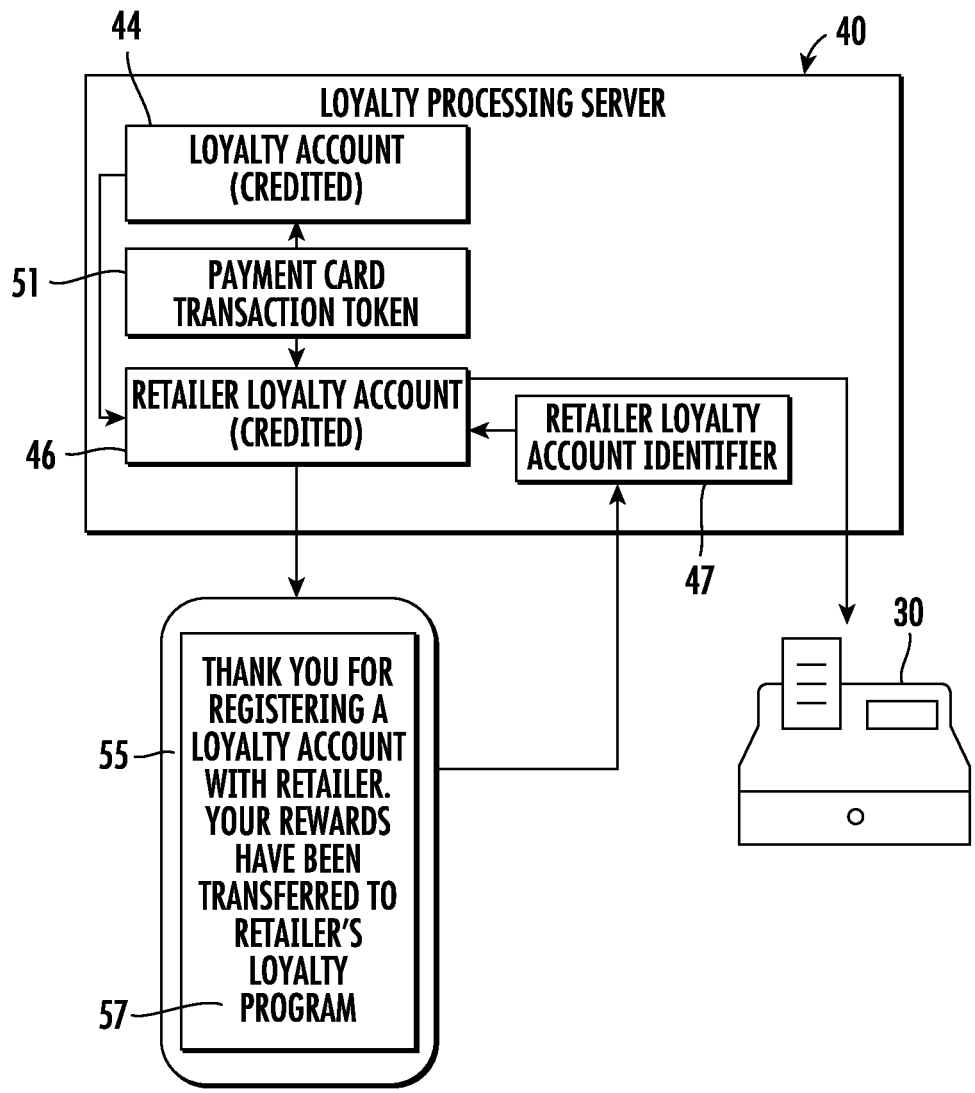
FIG. 7 is another schematic diagram of the loyalty processing system according to an embodiment.
Figure 8:
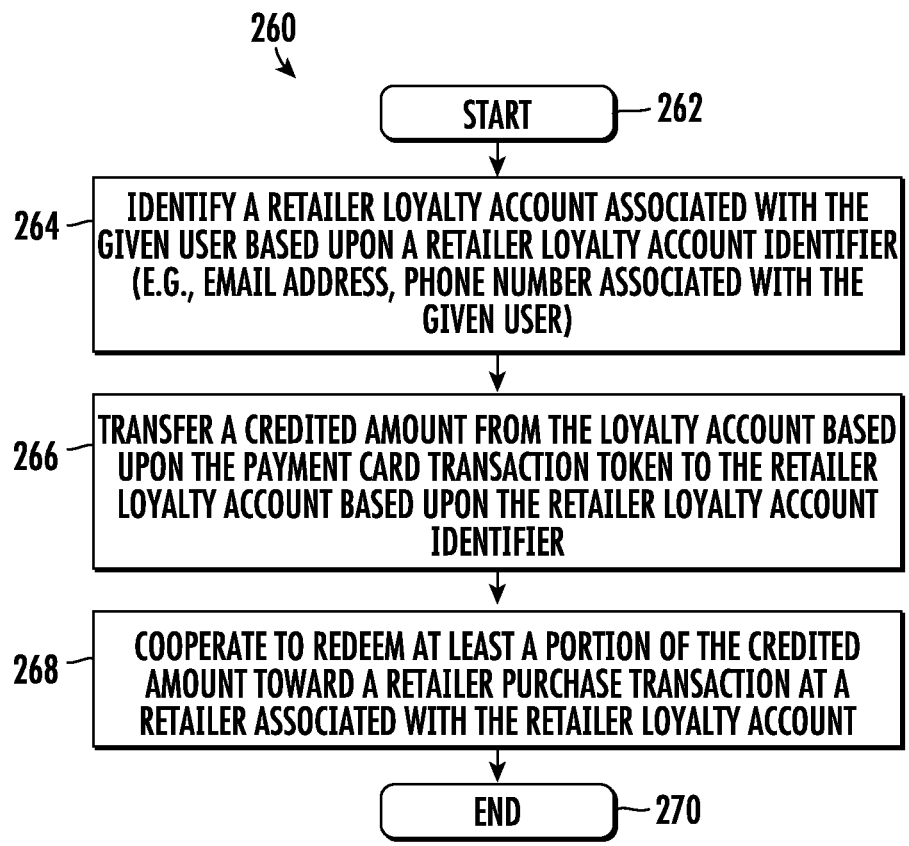
FIG. 8 is a flow diagram illustrating operation of the loyalty processing server of FIG. 7.

Referring now additionally to FIG. 7 and the flowchart 260 in FIG. 8, beginning at Block 262, operations of the loyalty processing server 40 with respect to redeeming or claiming the loyalty account 44 to a particular retailer will now be described. At Block 264, the loyalty processing server 40 identifies a retailer loyalty account 46 associated with the given user based upon a retailer loyalty account identifier 47. For example, the given user via the user device 55 may register for the retailer loyalty account 46 by way of the notification 45 or QR code. Based upon the associated retailer loyalty account identifier 47 (e.g., email, username, phone number associated with the given user) for accessing the retailer loyalty account 46, the loyalty processing server 40 transfers a credited amount from the loyalty account 44 (i.e., the amount credited to the loyalty account) based upon the payment card transaction token 51 to the retailer loyalty account 46 based upon the retailer loyalty account identifier 47 (Block 266). As will be appreciated by those skilled in the art, the loyalty account 44 may be conceptually considered a universal or retailer independent loyalty account that may span across multiple retailers. The notifications 45 may serve to entice the given user to positively provide registration information to a given retailer to claim or redeem the credited amount to the retailer loyalty account 46.

At Block 268, the loyalty processing server 40 may cooperate, for example, with the POS terminal 30, to redeem some or all of the credited amount. More particularly, the credited amount associated with the retailer loyalty account 46 may be applied to a retailer purchase transaction at the retailer associated with the retailer loyalty account. In some embodiments, the credited amount may be redeemable toward a particular product or brand of products, for example. Operations end at Block 270.

Figure 9:
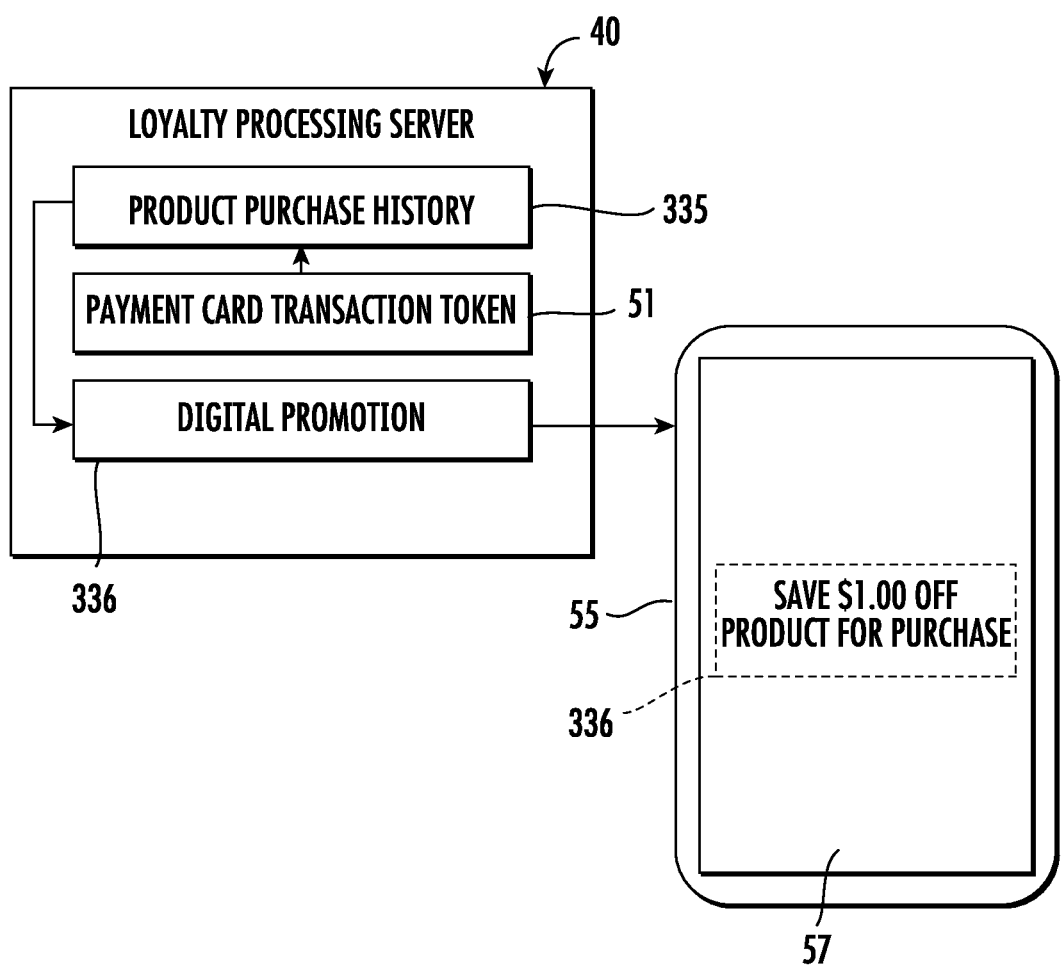
FIG. 9 is another schematic diagram of the loyalty processing system according to an embodiment.
Figure 10:
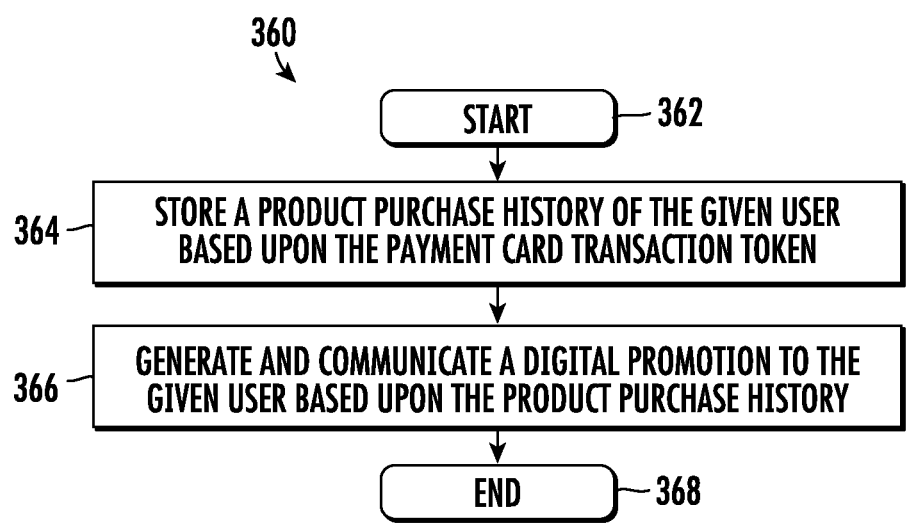
FIG. 10 is a flow diagram illustrating operation of the loyalty processing server of FIG. 9.

Referring now additionally to FIG. 9 and the flowchart 360 in FIG. 10, beginning at Block 362, further operations of the loyalty processing server 40 with respect to a digital promotion will now be described. At Block 364, the loyalty processing server 40 may store a product purchase history 335 of the given user based upon the payment card transaction token 51. The product purchase history 335 may be stored in the memory 42, for example, and include quantities, description, prices, product identifiers, date and time, and whether a digital promotion was applied. Of course, the product purchase history 335 may include other and/or additional information about historical purchases of the given user.

The loyalty processing server 40 may generate and communicate a digital promotion 336 to the given user based upon the product purchase history (Block 366). The digital promotion 336 may be redeemable toward a particular product or brand of products, and may be redeemable at the POS terminal 30, for example. The digital promotion 336 may be in contrast to the credited amount to either the loyalty account 44 or the retailer loyalty account 46 in that credited amount may be applied as a credit to the entire purchase amount rather than one or more products or brand of products. The loyalty processing server 40 may cooperate with the user device 55 to display the digital promotion 336 on the display 57 and/or save the digital promotion to a digital wallet associated with the given user.

In some embodiments, the digital promotion 336 may be printed on a register receipt or presented at the POS terminal 30. The loyalty processing server 40 may cooperate with the POS terminal 30 to validate the digital promotion 336. More particularly, the loyalty processing server 40 may validate the digital promotion 336 based upon the payment card transaction token 51. The digital promotion 336 may also be redeemed based upon the payment card transaction token 51. For example, the loyalty processing server 40 may cooperate with the POS terminal 30 to apply (e.g., automatically), the digital promotion when or upon obtaining the payment card transaction token 51. Operations end at Block 368.

In an embodiment, the payment card transaction token 51 may be used to assist in-store attribution of digital promotions or digital advertising. More particularly, the payment card transaction token may be used as a unifying identifier to improve attribution by marketing specific offers to a user or shopper. Typically to follow a shopper, cookies are used. However, cookies typically cannot be used to follow purchases of a given user when shopping begins online, but is completed in-store (i.e., the purchase transaction). Accordingly, the loyalty processing server 40 may determine, based upon the payment card transaction token 51, whether the given user purchased a product based upon an offer or digital promotion, and purchased the product at a time later based upon the payment card transaction token. No retailer specific loyalty program information may be used in this instance.

Online cookies may be associated with the payment card transaction token 51. The payment card transaction token 51 and a user identifier, for example, the email address of the given user or shopper, may be used as a basis for generating a cookie. For a given retailer, if there is a digital promotion associated with a given cookie, and the given cookie is activated, the loyalty processing server 40 may determine whether the given user has made a purchase online. The user identifier (i.e., email address) may be captured at the given retailer. For example, for a given email address with a payment card transaction token 51, cookies are used to target the given user with a digital promotion. The payment card transaction token 51 is associated with the payment card of the given user, as described above. If there is more than one payment card associated with the given user, then the loyalty processing server 40 may predict the identity of the given user or shopper and whether the given shopper has made an in-store purchase. The loyalty processing server 40 may make the prediction based upon internet protocol (IP) addresses, as will be appreciated by those skilled in the art. For example, purchase transactions from a same IP address, or purchase transactions having similar product purchase patterns, which may be learned, may be used as the basis for predicting the identity of the given shopper.

In an embodiment, the loyalty processing server 40 may build data profiles for the given user. More particularly, the loyalty processing server 40 may aggregate historical purchase, for example, over a few years and for multiple users or shoppers. The loyalty processing server 40 may create one or more audiences based upon the built data profiles. For example, every time a given user or shopper uses their payment card (e.g., credit card at a POS terminal), the loyalty processing server 40 adds purchase transaction data to the associated data profile or to the associated historical purchase data. The loyalty processing server 40 determines a grouping of users based upon data profile similarities to build the audience. The payment card transaction token 51 is used as an identifier to identify the given shopper as described above. The loyalty processing server 40 may also generate and communicate a digital promotion 336 also as described above, for example, and targeted to the group of users or target audience.

In an embodiment, a master profile may be generated by way of aggregation of multiple payment card transaction tokens 51. The loyalty processing server 40, based upon built profiles for each of a group of shoppers or users, may determine whether a group of users belong to the same household or whether a group of purchases (e.g., made with different payment cards or payment types) are purchases for a same user. The loyalty processing server 40 may make this determination based upon a determination of whether different payment card transaction tokens 51 are associated with a different platform, a different geographic location, and/or different payment cards, for example. The loyalty processing server 40 may aggregate the multiple payment card transaction tokens across different retailers, for example.

A method aspect is directed to a method of loyalty processing. The method includes using a loyalty processing server 40 to obtain, from POS terminal 30, a purchase transaction identifier 31 and a purchase amount 32 associated with a purchase transaction of a given user, and obtain, from a payment card processing server 50, a payment card transaction token 51 associated with the purchase transaction. The method also includes using the loyalty processing server 40 to match the payment card transaction token 51 to the purchase transaction identifier 31, and based thereon, generate a loyalty account 44 associated with the given user based upon the payment card transaction token 51, and credit the loyalty account 44 associated with the given user based upon the purchase amount 32. The method also includes using the loyalty processing server 40 to generate and communicate a notification 45 to the given user of the loyalty account 44 and the associated credit.

A computer readable medium aspect is directed to a non-transitory computer readable medium that includes computer executable instructions that when executed by a processor 41 cause the processor to perform operations. The operations include obtaining, from a point-of-sale (POS) terminal 30, a purchase transaction identifier 31 and a purchase amount 32 associated with a purchase transaction of a given user, and obtaining, from a payment card processing server 50, a payment card transaction token 51 associated with the purchase transaction. The operations also include matching the payment card transaction token 51 to the purchase transaction identifier 31, and based thereon, generating a loyalty account 44 associated with the given user based upon the payment card transaction token 51. The operations also include crediting the loyalty account 44 associated with the given user based upon the purchase amount 32, and generating and communicating a notification 45 to the given user of the loyalty account 44 and the associated credit.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system comprising:
   a point-of-sale (POS) terminal; and
   a loyalty processing server configured to
      obtain, from the POS terminal, a purchase transaction identifier and a purchase amount associated with a purchase transaction of a given user,
      obtain, from a payment card processing server, a payment card transaction token associated with the purchase transaction, the payment card transaction token being generated based upon a payment card associated with the given user,
      match the payment card transaction token to the purchase transaction identifier, and based thereon, generate a multi-retailer loyalty account associated with the given user based upon the payment card transaction token so that the payment card transaction token serves as a multi-retailer loyalty account identifier associated with the multi-retailer loyalty account,
      credit the multi-retailer loyalty account associated with the given user based upon the purchase amount,
      generate and communicate a notification to the given user of the multi-retailer loyalty account and the associated credit,
      store a product purchase history of the given user based upon the payment card transaction token,
      learn product purchase patterns of the given user based upon the product purchase history,
      generate and communicate a digital promotion for a product to the given user based upon the product purchase history, determine whether the given user has made an online purchase of the product based upon online tracking data associated with the digital promotion, the online tracking data being generated based upon the payment card transaction token, and when the given user has not made the online purchase, determine whether the given user purchased the product for purchase in response to the digital promotion based upon the payment card transaction token, and determine when a further payment transaction token associated with a further payment card and the payment transaction token are both associated with the given user to predict an identity of the given user based upon the learned purchase patterns and based upon at least one internet protocol (IP) address, and when so, determine whether the given user has made an online purchase of the product based upon the predicted identity of the given user and the online tracking data, and when the given user has not made the online purchase, determine whether the given user purchased the product for purchase in response to the digital promotion based upon the predicted identity of the given user.

2. The system of claim 1 wherein the loyalty processing server is configured to:
obtain, from the POS terminal, a further purchase transaction identifier and a further purchase amount associated with a further purchase transaction of the given user;
obtain, from the payment card processing server, the payment card transaction token associated with the further purchase transaction;
match the payment card transaction token to the further purchase transaction identifier; and
credit the multi-retailer loyalty account associated with the given user based upon the further purchase amount based upon the payment card transaction token.

3. The system of claim 1 wherein the loyalty processing server is configured to:
identify a retailer loyalty account associated with the given user based upon a retailer loyalty account identifier; and
transfer a credited amount from the multi-retailer loyalty account based upon the payment card transaction token to the retailer loyalty account based upon the retailer loyalty account identifier.

4. The system of claim 3 wherein the loyalty processing server is configured to cooperate to redeem at least a portion of the credited amount toward a retailer purchase transaction at a retailer associated with the retailer loyalty account.

5. The system of claim 3 wherein the retailer loyalty account identifier comprises at least one of an email address and a phone number associated with the given user.

6. The system of claim 1 wherein the loyalty processing server is configured to communicate the notification to the POS terminal for printing on a register receipt.

7. The system of claim 6 wherein the notification comprises a quick-response (QR) code; wherein the POS terminal is associated with a given retailer; and wherein the system further comprises a user device associated with the given user and configured to cooperate with the server to permit the given user to register for a retailer loyalty account based upon the QR code.

8. The system of claim 1 further comprising a user device associated with the given user; and wherein the server is configured to communicate the notification to the user device for display thereat.

9. The system of claim 1 wherein the payment card transaction token comprises a serialized payment card transaction token.

10. A loyalty processing server comprising:
a processor and an associated memory configured to
obtain, from a point-of-sale (POS) terminal, a purchase transaction identifier and a purchase amount associated with a purchase transaction of a given user,
obtain, from a payment card processing server, a payment card transaction token associated with the purchase transaction, the payment card transaction token being generated based upon a payment card associated with the given user,
match the payment card transaction token to the purchase transaction identifier, and based thereon, generate a multi-retailer loyalty account associated with the given user based upon the payment card transaction token so that the payment card transaction token serves as a multi-retailer loyalty account identifier associated with the multi-retailer loyalty account,
credit the multi-retailer loyalty account associated with the given user based upon the purchase amount,
generate and communicate a notification to the given user of the multi-retailer loyalty account and the associated credit,
store a product purchase history of the given user based upon the payment card transaction token,
learn product purchase patterns of the given user based upon the product purchase history,
generate and communicate a digital promotion for a product to the given user based upon the product purchase history,
determine whether the given user has made an online purchase of the product based upon online tracking data associated with the digital promotion, the online tracking data being generated based upon the payment card transaction token, and when the given user has not made the online purchase, determine whether the given user purchased the product for purchase in response to the digital promotion based upon the payment card transaction token, and
determine when a further payment transaction token associated with a further payment card and the payment transaction token are both associated with the given user to predict an identity of the given user based upon the learned purchase patterns and based upon at least one internet protocol (IP) address, and when so, determine whether the given user has made an online purchase of the product based upon the predicted identity of the given user and the online tracking data, and when the given user has not made the online purchase, determine whether the given user purchased the product for purchase in response to the digital promotion based upon the predicted identity of the given user.

11. The loyalty processing server of claim 10 wherein the processor is configured to:
obtain, from the POS terminal, a further purchase transaction identifier and a further purchase amount associated with a further purchase transaction of the given user;

obtain, from the payment card processing server, the payment card transaction token associated with the further purchase transaction;

match the payment card transaction token to the further purchase transaction identifier; and credit the multi-retailer loyalty account associated with the given user based upon the further purchase amount based upon the payment card transaction token.

12. The loyalty processing server of claim 10 wherein the processor is configured to:

identify a retailer loyalty account associated with the given user based upon a retailer loyalty account identifier; and transfer a credited amount from the multi-retailer loyalty account based upon the payment card transaction token to the retailer loyalty account based upon the retailer loyalty account identifier.

13. The loyalty processing server of claim 12 wherein the processor is configured to cooperate to redeem at least a portion of the credited amount toward a retailer purchase transaction at a retailer associated with the retailer loyalty account.

14. A method of loyalty processing comprising:

using a loyalty processing server to obtain, from a point-of-sale (POS) terminal, a purchase transaction identifier and a purchase amount associated with a purchase transaction of a given user, obtain, from a payment card processing server, a payment card transaction token associated with the purchase transaction, the payment card transaction token being generated based upon a payment card associated with the given user, match the payment card transaction token to the purchase transaction identifier, and based thereon, generate a multi-retailer loyalty account associated with the given user based upon the payment card transaction token so that the payment card transaction token serves as a multi-retailer loyalty account identifier associated with the multi-retailer loyalty account, credit the multi-retailer loyalty account associated with the given user based upon the purchase amount, generate and communicate a notification to the given user of the multi-retailer loyalty account and the associated credit, store a product purchase history of the given user based upon the payment card transaction token, learn product purchase patterns of the given user based upon the product purchase history, generate and communicate a digital promotion for a product to the given user based upon the product purchase history, determine whether the given user has made an online purchase of the product based upon online tracking data associated with the digital promotion, the online tracking data being generated based upon the payment card transaction token, and when the given user has not made the online purchase, determine whether the given user purchased the product for purchase in response to the digital promotion based upon the payment card transaction token, and determine when a further payment transaction token associated with a further payment card and the payment transaction token are both associated with the given user to predict an identity of the given user based upon the learned purchase patterns and based upon at least one internet protocol (IP) address, and when so, determine whether the given user has made an online purchase of the product based upon the predicted identity of the given user and the online tracking data, and when the given user has not made the online purchase, determine whether the given user purchased the product for purchase in response to the digital promotion based upon the predicted identity of the given user.

15. The method of claim 14 wherein using the loyalty processing server comprises using the loyalty processing server to:

obtain, from the POS terminal, a further purchase transaction identifier and a further purchase amount associated with a further purchase transaction of the given user;

obtain, from the payment card processing server, the payment card transaction token associated with the further purchase transaction;

match the payment card transaction token to the further purchase transaction identifier; and credit the multi-retailer loyalty account associated with the given user based upon the further purchase amount based upon the payment card transaction token.

16. The method of claim 14 wherein using the loyalty processing server comprises using the loyalty processing server to:

identify a retailer loyalty account associated with the given user based upon a retailer loyalty account identifier; and transfer a credited amount from the multi-retailer loyalty account based upon the payment card transaction token to the retailer loyalty account based upon the retailer loyalty account identifier.

17. A non-transitory computer readable medium comprising computer executable instructions that when executed by a processor cause the processor to perform operations comprising:

obtaining, from a point-of-sale (POS) terminal, a purchase transaction identifier and a purchase amount associated with a purchase transaction of a given user;

obtaining, from a payment card processing server, a payment card transaction token associated with the purchase transaction, the payment card transaction token being generated based upon a payment card associated with the given user;

matching the payment card transaction token to the purchase transaction identifier, and based thereon, generating a multi-retailer loyalty account associated with the given user based upon the payment card transaction token;

crediting the multi-retailer loyalty account associated with the given user based upon the purchase amount;

generating and communicating a notification to the given user of the multi-retailer loyalty account and the associated credit;

storing a product purchase history of the given user based upon the payment card transaction token;

learning product purchase patterns of the given user based upon the product purchase history;

generating and communicating a digital promotion for a product to the given user based upon the product purchase history;

determining whether the given user has made an online purchase based upon online tracking data associated with the digital promotion, the online tracking data being generated based upon the payment card transaction token, and when the given user has not made the online purchase, determining whether the given user purchased the product for purchase in response to the digital promotion based upon the payment card transaction token; and determining when a further payment transaction token associated with a further payment card and the payment transaction token are both associated with the given user to predict an identity of the given user based upon the learned purchase patterns and based upon at least one internet protocol (IP) address, and when so, determining whether the given user has made an online purchase of the product based upon the predicted identity of the given user and the online tracking data, and when the given user has not made the online purchase, determining whether the given user purchased the product for purchase in response to the digital promotion based upon the predicted identity of the given user.

18. The non-transitory computer readable medium of claim 17 wherein the operations comprise:

obtaining, from the POS terminal, a further purchase transaction identifier and a further purchase amount associated with a further purchase transaction of the given user;

obtaining, from the payment card processing server, the payment card transaction token associated with the further purchase transaction;

matching the payment card transaction token to the further purchase transaction identifier; and crediting the multi-retailer loyalty account associated with the given user based upon the further purchase amount based upon the payment card transaction token.

19. The non-transitory computer readable medium of claim 17 wherein the operations comprise:

identifying a retailer loyalty account associated with the given user based upon a retailer loyalty account identifier; and transferring a credited amount from the multi-retailer loyalty account based upon the payment card transaction token to the retailer loyalty account based upon the retailer loyalty account identifier.

\* \* \* \* \*